US011905146B2

(12) United States Patent
Hayashi

(10) Patent No.: US 11,905,146 B2
(45) Date of Patent: Feb. 20, 2024

(54) MOVABLE RANGE DISPLAY SYSTEM AND CRANE EQUIPPED WITH MOVABLE RANGE DISPLAY SYSTEM

(71) Applicant: TADANO LTD., Kagawa (JP)

(72) Inventor: Hiroyuki Hayashi, Kagawa (JP)

(73) Assignee: TADANO LTD., Kagawa (JP)

( * ) Notice: Subject to any disclaimer, the term of this patent is extended or adjusted under 35 U.S.C. 154(b) by 196 days.

(21) Appl. No.: 17/615,736

(22) PCT Filed: Jun. 19, 2020

(86) PCT No.: PCT/JP2020/024142
§ 371 (c)(1),
(2) Date: Dec. 1, 2021

(87) PCT Pub. No.: WO2020/256106
PCT Pub. Date: Dec. 24, 2020

(65) Prior Publication Data
US 2022/0234867 A1 Jul. 28, 2022

(30) Foreign Application Priority Data
Jun. 20, 2019 (JP) ................................ 2019-114949

(51) Int. Cl.
*B66C 13/46* (2006.01)
*B66C 23/90* (2006.01)
*B66C 23/94* (2006.01)

(52) U.S. Cl.
CPC ............ *B66C 13/46* (2013.01); *B66C 23/905* (2013.01); *B66C 23/94* (2013.01)

(58) Field of Classification Search
None
See application file for complete search history.

(56) References Cited

U.S. PATENT DOCUMENTS 3,893,093 A * 7/1975 Paredes ................ B66C 23/905 340/685
4,052,602 A * 10/1977 Horn .................... B66C 23/905 340/685

(Continued)

FOREIGN PATENT DOCUMENTS

JP H07-089697 A 4/1995
JP H07089697 A * 4/1995

(Continued)

OTHER PUBLICATIONS

Aug. 25, 2020, International Search Report issued for related PCT application No. PCT/JP2020/024142.

(Continued)

*Primary Examiner* — Muhammad Adnan
(74) *Attorney, Agent, or Firm* — Paratus Law Group, PLLC

(57) ABSTRACT

A system control device (36): acquires the three-dimensional information of the work site, the weight of a load W, and the operating condition of the crane (1) via an input device (34) or a system-side communication device (33); upon acquiring the arrangement position and arrangement direction of the vehicle (2) at the work site via the input device (34), calculates the movable range of the crane (1) in the arrangement position and arrangement direction of the vehicle (2) taking the three-dimensional information of the work site into consideration; and overlays the image (M1) of the crane (1) and the movable range (A) on the two-dimensional image or the three-dimensional image of the work site displayed on a display device (35).

3 Claims, 10 Drawing Sheets

(56) References Cited

U.S. PATENT DOCUMENTS

| | | | | | |
|---|---|---|---|---|---|
| 5,160,056 | A * | 11/1992 | Yoshimatsu | B66C 23/905 212/277 |
| 5,730,305 | A * | 3/1998 | Ichiba | B66C 23/905 212/277 |
| 5,823,370 | A * | 10/1998 | Ueda | B66C 23/905 212/276 |
| 9,300,954 | B2 | 3/2016 | Tanizumi et al. | |
| 10,207,904 | B2 * | 2/2019 | Morath | B66C 23/905 |
| 11,358,840 | B2 * | 6/2022 | Hayashi | B66C 13/22 |
| 11,717,969 | B1 * | 8/2023 | Mourlam | B25J 9/1689 700/247 |
| 2005/0098520 | A1 * | 5/2005 | Frankenberger | B66C 23/74 212/276 |
| 2013/0013144 | A1 * | 1/2013 | Tanizumi | B66C 23/905 701/34.4 |
| 2015/0249821 | A1 * | 9/2015 | Tanizumi | G06T 7/593 348/46 |
| 2017/0036894 | A1 * | 2/2017 | Braun | B66C 13/18 |
| 2018/0057318 | A1 * | 3/2018 | Benton | B66C 13/063 |
| 2019/0152751 | A1 * | 5/2019 | Midorikawa | B66C 23/90 |
| 2019/0322496 | A1 | 10/2019 | Hayashi | |
| 2020/0165107 | A1 * | 5/2020 | Kosaka | G01B 11/00 |
| 2020/0223672 | A1 * | 7/2020 | Furuichi | B66C 23/78 |
| 2020/0231418 | A1 * | 7/2020 | Furuichi | B66C 23/90 |
| 2020/0391980 | A1 * | 12/2020 | Hayashi | B66C 13/40 |
| 2021/0047154 | A1 * | 2/2021 | Hayashi | G05D 1/0016 |
| 2021/0053803 | A1 * | 2/2021 | Hayashi | B66C 23/90 |
| 2021/0214194 | A1 * | 7/2021 | Mizuki | B66C 23/88 |
| 2021/0221654 | A1 * | 7/2021 | Yodawara | B66C 13/48 |
| 2021/0233230 | A1 * | 7/2021 | Yodawara | G06T 7/0004 |
| 2021/0238017 | A1 * | 8/2021 | Hayashi | B66C 13/46 |
| 2021/0269287 | A1 * | 9/2021 | Iwazawa | B66C 23/34 |
| 2022/0017336 | A1 * | 1/2022 | Ishikawa | G01S 7/4808 |
| 2022/0219949 | A1 * | 7/2022 | Hayashi | B66C 13/46 |
| 2022/0219954 | A1 * | 7/2022 | Teranishi | B66C 13/46 |
| 2022/0227606 | A1 * | 7/2022 | Nakamura | B66C 13/46 |
| 2022/0380184 | A1 * | 12/2022 | Onishi | G06T 7/70 |

FOREIGN PATENT DOCUMENTS

| | | | | |
|---|---|---|---|---|
| JP | 2014-151979 A | | 8/2014 | |
| JP | 2014151979 A | * | 8/2014 | B60R 1/00 |
| JP | 2014-222795 A | | 11/2014 | |
| JP | 2018-095370 A | | 6/2018 | |
| JP | 2018-095374 A | | 6/2018 | |
| JP | 2018-095376 A | | 6/2018 | |
| JP | 2018-095449 A | | 6/2018 | |
| WO | WO 2018/105740 A1 | | 6/2018 | |

OTHER PUBLICATIONS

Aug. 25, 2020, International Search Opinion issued for related PCT application No. PCT/JP2020/024142.

Jul. 7, 2023, European Search Report issued for related EP Application No. 20827578.4.

* cited by examiner

MOVABLE RANGE DISPLAY SYSTEM AND CRANE EQUIPPED WITH MOVABLE RANGE DISPLAY SYSTEM

CROSS REFERENCE TO PRIOR APPLICATION

This application is a National Stage Patent Application of PCT International Patent Application No. PCT/JP2020/024142 (filed on Jun. 19, 2020) under 35 U.S.C. § 371, which claims priority to Japanese Patent Application No. 2019-114949 (filed on Jun. 20, 2019), which are all hereby incorporated by reference in their entirety.

TECHNICAL FIELD

The present invention relates to a movable range display system and a crane equipped with the movable range display system.

BACKGROUND ART

Conventionally, in a mobile crane, an upper slewing table is provided on a lower travelling body capable of self-travelling, and a boom that expands and contracts is provided on the slewing table so as to be freely raised and lowered. The mobile crane can lift a load at a work site, move the load to a position where the load can be conveyed to a destination, and perform a conveyance work in such a mobile crane, the weight of the load that can be conveyed varies depending on a boom length, a raising-lowering angle of the boom, and a slewing position of an upper slewing body with respect to the lower travelling body. That is, in the mobile crane, a rated work radius is determined according to the weight of each load to be conveyed. Accordingly, a movable range display device of a mobile crane that displays the rated work radius corresponding to the weight of a load to be conveyed for each slewing position is known. For example, it is as in Patent Literature 1.

The movable range display device of the mobile crane described in Patent Literature 1 is connected to a boom length detection means, a boom angle detection means, a slewing position detection means, and a load detection means. In the movable range display device of the mobile crane, a control unit calculates an actual load and a limit work radius for each slewing angle based on information detected by these detection means, and displays, on polar coordinates, the limit work radius for each slewing angle with the calculated actual load. Further, the movable range display device of the mobile crane is configured to display an actual work radius value while overlaying the actual work radius value on an actual slewing angle corresponding position on the polar coordinates. Since the movable range display device of the mobile crane having the above configuration illustrates the movable range of the boom and the current position of the boom according to the weight of the load to be conveyed, an operation such as raising, lowering, expansion, contraction, and slewing of the boom can be easily performed within the movable range.

The movable range display device of the mobile crane configured as described above illustrates a range in which the mobile crane can carry a load without falling over. However, in an actual work site, a structure (feature) or the like may exist within the movable range of the mobile crane. That is, with the mobile crane, even when a lifting position and a suspending position of the load are within the movable range, there occurs a range in which the conveyance is not possible due to interference with the structure or the like when the structure or the like is present. However, in the movable range display device of the mobile crane described in Patent Literature 1, the user who uses the movable range display device cannot determine whether the load can be conveyed to a destination without interfering with the structure or the like at the current arrangement position of the mobile crane because the situation of a surrounding structure and the like is not reflected on the movable range.

CITATION LIST

Patent Literature

Patent Literature 1: JP 7-89697 A

SUMMARY OF THE INVENTION

Problems to be Solved by the Invention

An object of the present invention is to provide a crane including a movable range display system movable range display system that enables a user to determine whether a load can be conveyed to a destination without interfering with a feature or the like in a work site.

Solutions to Problems

The problem to be solved by the present invention is as described above, and a solution to solve the problem will be described below.

That is, the present invention is a movable range display system including a first acquisition unit that acquires three-dimensional information of a work site, a second acquisition unit that acquires an operating condition of a crane in which a boom is provided in a travelling body and a weight of a load carried by the crane, a third acquisition unit that acquires an arrangement position and an arrangement direction of the travelling body at the work site, a calculation unit that calculates a movable range of the crane in the arrangement position and the arrangement direction of the travelling body on the basis of the three-dimensional information of the work site, the operating condition, and the weight of the load, and a display unit that displays an image indicating the work site, an image indicating the mobile crane, and the movable range in an overlaid manner.

Effects of the Invention

The present invention has the following effects.

In the present invention, a user can determine whether a load can be conveyed to a destination without interfering with a feature or the like in a work site.

BRIEF DESCRIPTION OF DRAWINGS

FIG. 4A illustrates a top view image of the movable range, and FIG. 4B illustrates a cross-sectional view image of the movable range along an axial direction of the boom.

FIG. 5A illustrates an interference range of a top view image of the crane, and FIG. 5B illustrates an interference range of a cross-sectional view image.

FIG. 6A illustrates the movable range in a state where a slewing table is rotated in an arbitrary direction, and FIG. 6B illustrates a state where the movable range is rotated according to rotation of the slewing table.

FIG. 7A illustrates the movable range in a state where the crane approaches the feature, and FIG. 7B illustrates the movable range in a state where the crane is separated from the feature.

FIG. 10A illustrates a top view image of the movable range, and FIG. 10B illustrates a cross-sectional view image of the movable range along the axial direction of the boom.

DESCRIPTION OF EMBODIMENTS

Hereinafter, a crane 1 that is an embodiment of a mobile crane according to the present invention will be described using FIGS. 1 and 2. Note that a rough terrain crane will be described in the present embodiment, but the mobile crane is only required to be an all-terrain crane, a truck crane, a truck loader crane, or the like.

Figure 1:
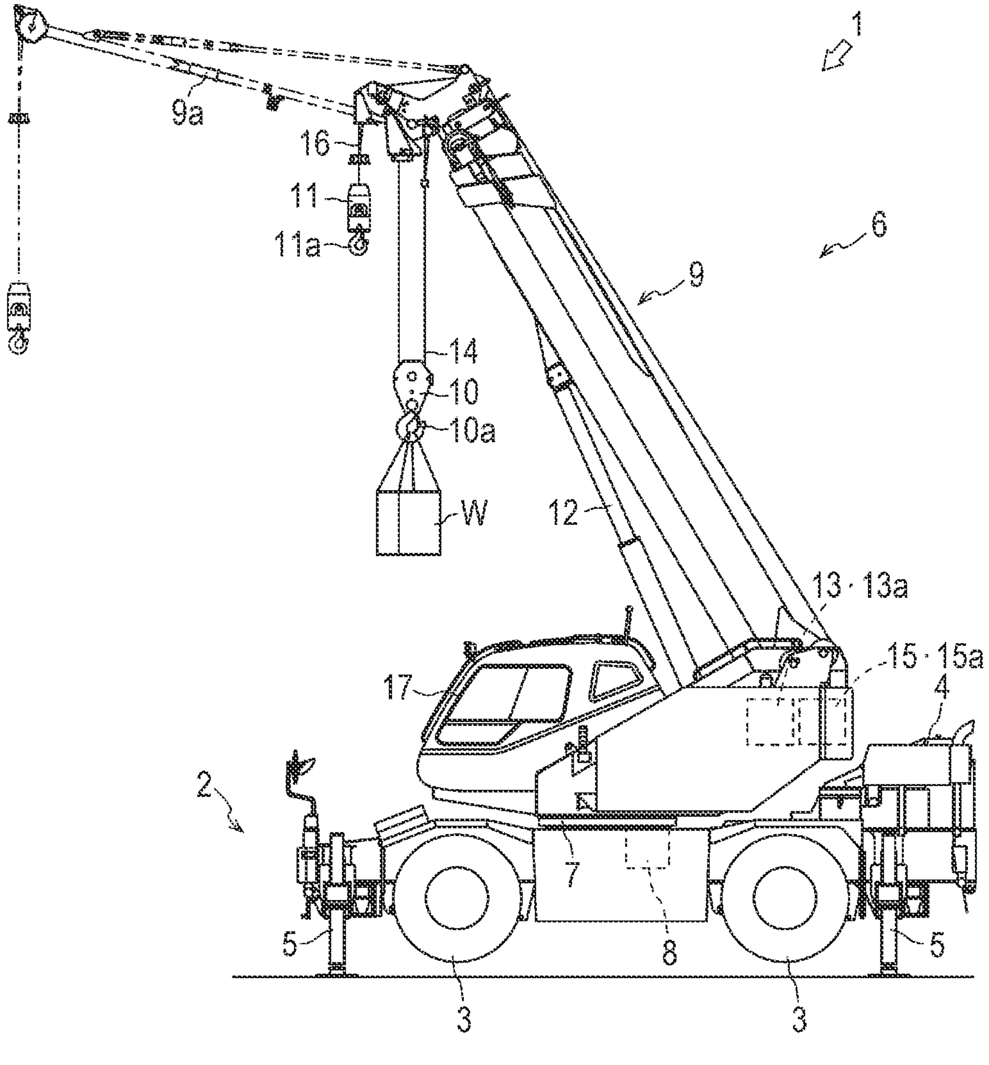
FIG. 1 is a side view illustrating an overall configuration of a crane.

As illustrated in FIG. 1, the crane 1 is a mobile crane 1 that can be moved to an unspecified place. The crane 1 includes a vehicle 2 that is a travelling body, a crane apparatus 6 that is a work apparatus, a control device 31, and a remote operation terminal 37 (see FIG. 2) capable of remotely operating the crane apparatus 6. Further, the crane 1 includes a movable range display system 32 (see FIG. 2).

The vehicle 2 is a mobile body that transports the crane apparatus 6. The vehicle 2 has a plurality of wheels 3 and travels using an engine 4 as a power source. The vehicle 2 is provided with outriggers 5. The vehicle 2 can expand the workable range of the crane 1 by extending the outriggers 5 in a width direction of the vehicle 2 and grounding jack cylinders. In the outriggers 5, each outrigger 5 is provided with a sensor for the outrigger 5 that detects an overhanging amount of the outrigger 5.

The crane apparatus 6 is an apparatus that lifts a load W with a wire rope. The crane apparatus 6 includes a slewing table 7, a slewing hydraulic motor 8, a boom 9, a main hook block 10, a sub hook block 11, a raising-lowering hydraulic cylinder 12, a main winch 13, a main hydraulic motor 13*a*, a main wire rope 14, a sub winch 15, a sub hydraulic motor 15*a*, a sub wire rope 16, a cabin 17, and the like.

The slewing table 7 is a device that slews the crane apparatus 6. The slewing table 7 is configured to be rotatable about the center of an annular bearing as a rotation center. The slewing table 7 is provided with a slewing hydraulic motor 8 that is an actuator. The slewing table 7 is configured to be slewable in one direction and another direction by the slewing hydraulic motor 8.

The slewing hydraulic motor 8 is rotationally operated by a slewing valve 23 (see FIG. 2) that is an electromagnetic proportional switching valve. The slewing valve 23 can control the flow rate of hydraulic oil supplied to the slewing hydraulic motor 8 to an arbitrary flow rate. The slewing table 7 is provided with a slewing sensor 27 (see FIG. 2) that detects a slewing angle α, which is an angle at which the slewing table 7 has slewed from a reference position.

The boom 9 is a beam member that supports the wire rope in a state where the load W can be lifted. A base end of a base boom member of the boom 9 is swingably provided substantially at the center of the slewing table 7. The boom 9 is configured to be capable of extending and contracting in the axial direction by moving each boom member by an extension-contraction hydraulic cylinder that is not illustrated and that is an actuator. Further, the boom 9 is provided with a jib 9*a*. The boom 9 is provided with an extension-contraction sensor 28 that detects the length of the boom 9, a weight sensor that detects the weight of the load W, and the like.

The suspended load camera 9*b* (see FIG. 2) is an imaging device that captures an image of the load W and a feature C around the load W. The suspended load camera 9*b* is provided at a tip portion of the boom 9. The suspended load camera 9*b* is configured to be capable of capturing an image of the load W and a feature C and topography around the crane 1 from vertically above the load W.

The main hook block 10 and the sub hook block 11 are members for suspending the load W. The main hook block 10 is provided with a plurality of hook sheaves around which the main wire rope 14 is wound, and a main hook 10*a* for suspending the load W. The sub hook block 11 is provided with a sub hook 11*a* for hanging the load W.

The raising-lowering hydraulic cylinder 12 is an actuator that raises and lowers the boom 9 and holds the posture of the boom 9. The raising-lowering hydraulic cylinder 12 is operated to expand and contract by a raising-lowering valve 25 (see FIG. 2) that is an electromagnetic proportional switching valve. The boom 9 is provided with a raising-lowering sensor 29 (see FIG. 2) that detects a raising-lowering angle β of the boom 9.

The main winch 13 and the sub winch 15 reel in (wind up) and reel out (wind out) the main wire rope 14 and the sub wire rope 16. The main winch 13 is configured such that a main drum around which the main wire rope 14 is wound is rotated by a main hydraulic motor 13*a* that is an actuator, and the sub winch 15 is configured such that a sub drum around which the sub wire rope 16 is wound is rotated by a sub hydraulic motor 15*a* that is an actuator.

The main hydraulic motor 13*a* is rotationally operated by a main valve 26*m* (see FIG. 2) that is an electromagnetic proportional switching valve. The main winch 13 is configured to be operable at an arbitrary reel in and reel out speed by controlling the main hydraulic motor 13*a* by the main valve 26*m*. Similarly, the sub winch 15 is configured to be operable at an arbitrary reel in and reel out speed by controlling the sub hydraulic motor 15*a* by a sub valve 26*s* (see FIG. 2) that is an electromagnetic proportional switching valve.

The cabin 17 is mounted on the slewing table 7. The cabin 17 is provided with a cockpit (not illustrated). The cockpit is provided with an operation part for travelling operation of the vehicle 2, a slewing operation part 18 for operating the crane apparatus 6, a raising-lowering operation part 19, an extension-contraction operation part 20, a main drum operation part 21*m*, a sub drum operation part 21*s*, and the like.

Figure 2:
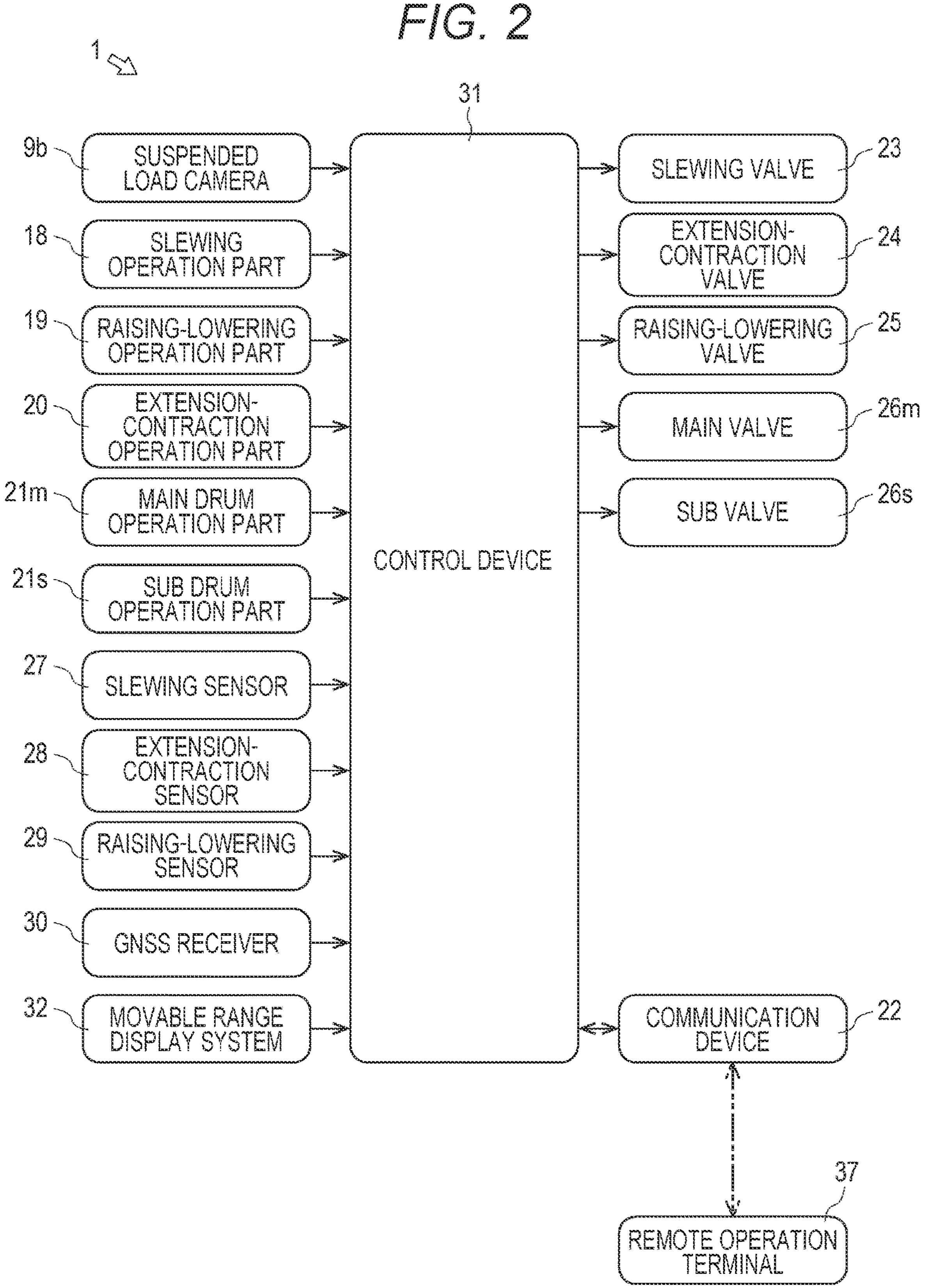
FIG. 2 is a block diagram illustrating a control configuration of the crane.

As illustrated in FIG. 2, a communication device 22 is a device that receives a control signal from the remote operation terminal 37 via a wide area information communication network or the like, and transmits control information and the like from the crane apparatus 6 via the wide area information communication network or the like. The communication device 22 is provided in the cabin 17. The communication device 22 is configured to transfer a control signal or the like to the control device 31 of the crane 1 when the control signal or the like is received from the remote operation terminal 37.

A GNSS receiver 30 (see FIG. 2) is a receiver constituting a global navigation satellite system, and is a device that receives a ranging electric wave from a satellite and calculates latitude, longitude, and altitude which are position coordinates of the receiver. The crane 1 can acquire position coordinates of the tip of the boom 9 and position coordinates of the cabin 17 by the GNSS receiver 30.

The control device 31 is a device that controls actuators of the crane 1 via respective operation valves. The control device 31 is provided in the cabin 17. The control device 31 may substantially have a configuration in which a CPU, a ROM, a RAM, an HDD, and the like are connected by a bus, or have a configuration including a one-chip LSI or the like. The control device 31 stores various programs and data in order to control operation of each actuator, switching valve, sensor, and the like.

The control device 31 is connected to the suspended load camera 9*b*, the slewing operation part 18, the raising-lowering operation part 19, the extension-contraction operation part 20, the main drum operation part 21*m*, and the sub drum operation part 21*s*, and can acquire a video of the suspended load camera 9*b* and acquire the operation amount of each of the slewing operation part 18, the raising-lowering operation part 19, the main drum operation part 21*m*, and the sub drum operation part 21*s*.

The control device 31 is connected to the communication device 22, and can acquire the control signal from the remote operation terminal 37 and transmit the control information from the crane apparatus 6, the video from the suspended load camera 9*b*, and the like.

The control device 31 is connected to the slewing valve 23, an extension-contraction valve 24, the raising-lowering valve 25, the main valve 26*m*, and the sub valve 26*s*, and can transmit a control signal to the slewing valve 23, the raising-lowering valve 25, the main valve 26*m*, and the sub valve 26*s*.

The control device 31 is connected to the slewing sensor 27, the extension-contraction sensor 28, and the raising-lowering sensor 29, and can acquire posture information such as a slewing angle α, a boom, length, and a raising-lowering angle β of the slewing table 7 and the weight of the load W.

The control device 31 is connected to the GNSS receiver 30, and can acquire position coordinates of the tip of the boom 9 and position coordinates of the cabin 17 with high accuracy. Further, the control device 31 can calculate an arrangement direction, which is the travelling direction of the vehicle 2, with high accuracy from the position coordinates of the tip of the boom 9 and the position coordinates of the cabin 17 that have been acquired.

The control device 31 can generate a control signal corresponding to each operation part on the basis of operation amounts of the slewing operation part 18, the raising-lowering operation part 19, the extension-contraction operation part 20, the main drum operation part 21*m*, and the sub drum operation part 21*s*.

The movable range display system 32 is a system that calculates and displays a movable range A of the crane 1 at an arbitrary position in the work site. The movable range display system 32 is provided in the cabin 17 of the crane 1.

The movable range display system 32 is connected to the control device 31, and can acquire, from the control device 31, the overhanging length of each outrigger 5, the slewing angle α of the slewing table 7, the raising-lowering angle β and the boom length of the boom 9, and the weight of the load W from the control device 31.

The crane 1 configured as described above can move the crane apparatus 6 to an arbitrary position by causing the vehicle 2 to travel. Further, in the crane 1, a lifting height and a work radius of the crane apparatus 6 can be expanded by raising the boom 9 at an arbitrary raising-lowering angle β by the raising-lowering hydraulic cylinder 12 by operating the raising-lowering operation part 19, and by extending the boom 9 to an arbitrary boom length by operating the extension-contraction operation part 20. Further, in the crane 1, the load W can be suspended by the sub drum operation part 21*s* and the like, and the load W can be conveyed by clewing the slewing table 7 by operating the slewing operation part 18.

Figure 3:
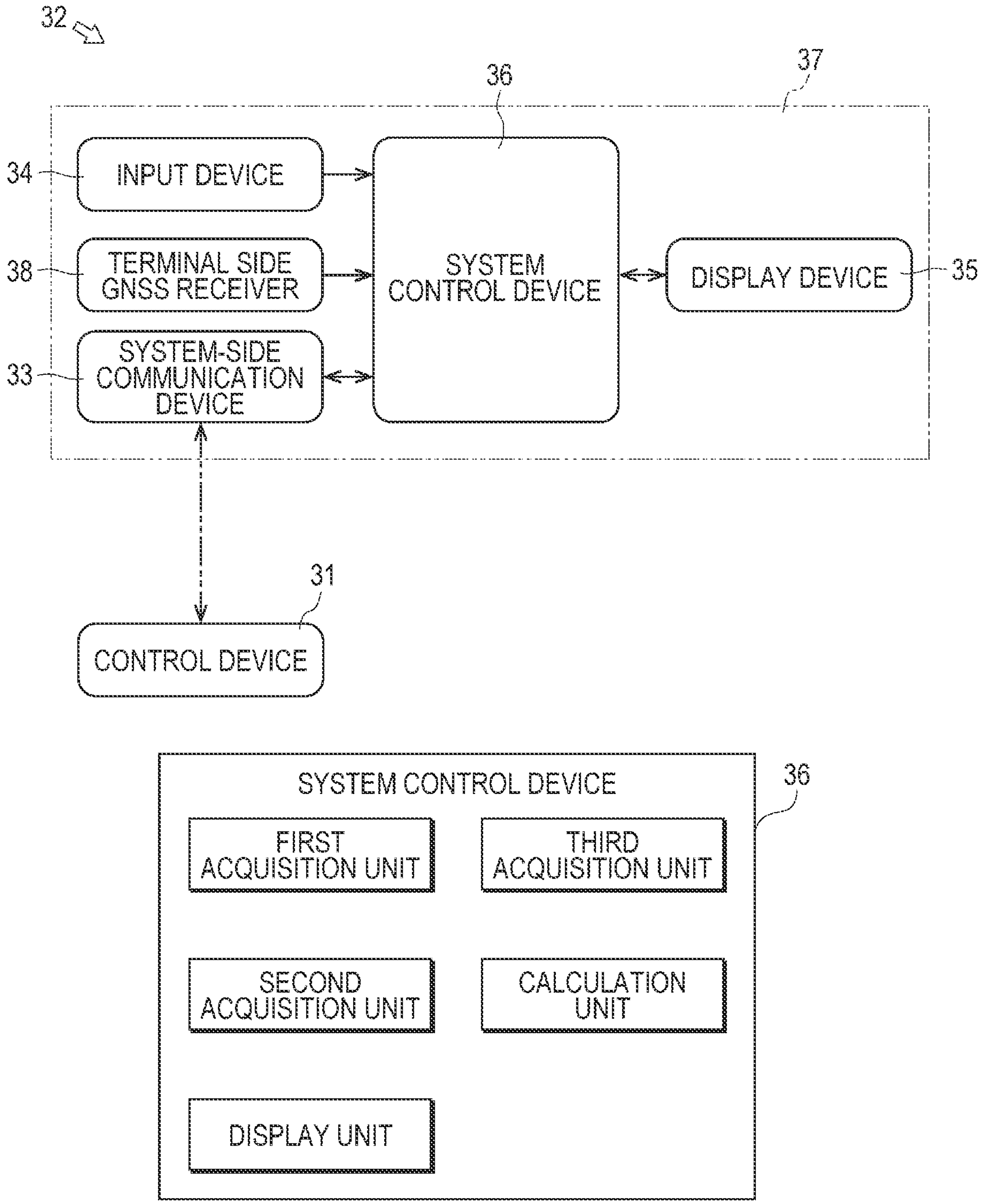
FIG. 3 is a block diagram illustrating a control configuration of a movable range display system.
Figure 4A:
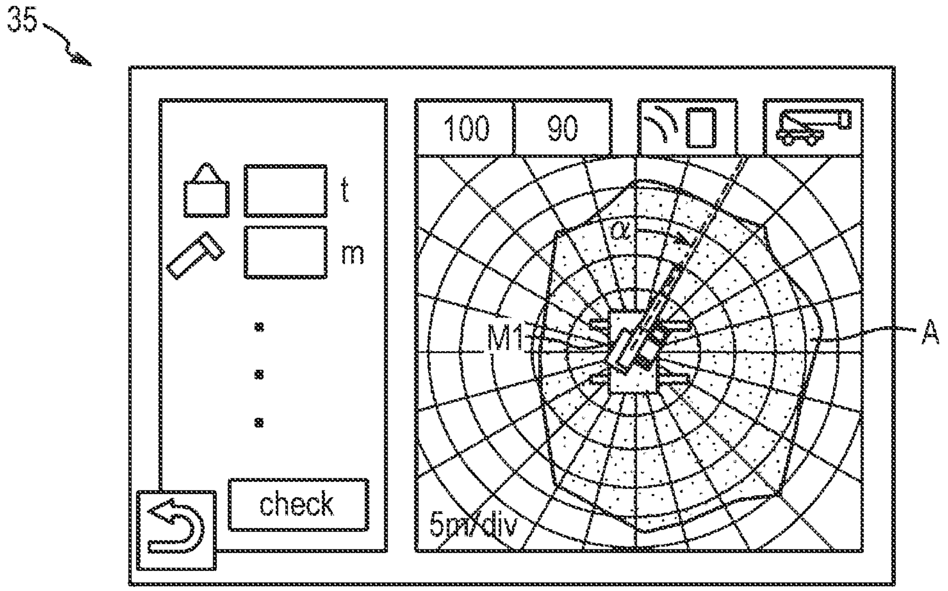
FIGS. 4A and 4B illustrate a display mode of a movable range.
Figure 4B:
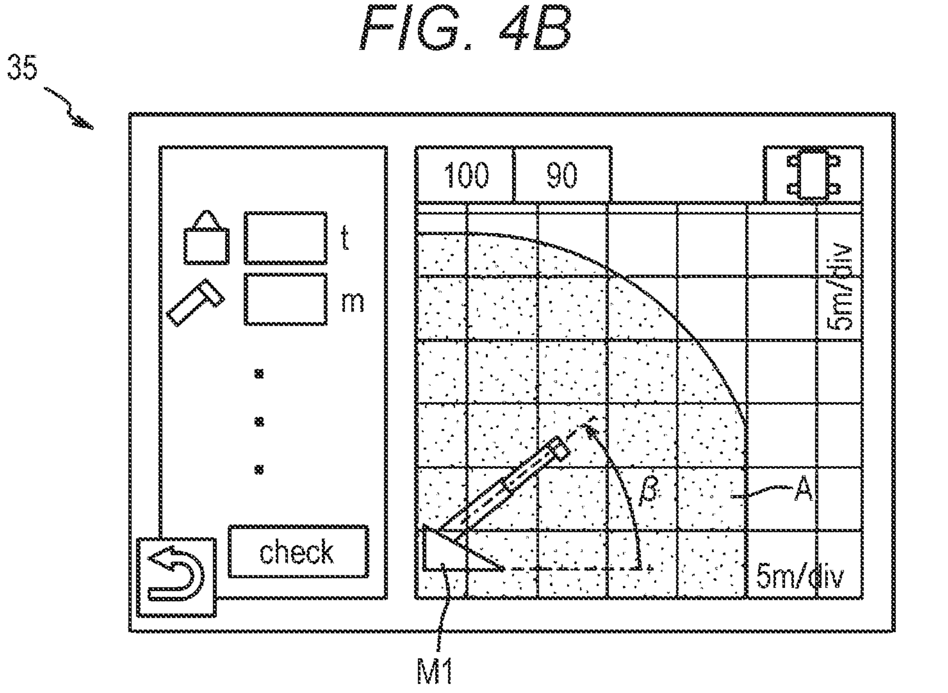

Next, the movable range display system 32 will be specifically described using FIGS. 3 and 4A and 4B. The movable range display system 32 is a system that calculates the movable range A of the crane 1 under an arbitrary operation condition a an arbitrary arrangement position and arrangement direction in the work site, and displays the movable range A in a two-dimensional image or a three-dimensional image. The movable range A of the crane 1 means a range in which the tip of the boom 9 can reach in a state where a load W having a predetermined weight is suspended on the boom 9 extended to a predetermined boom length.

As illustrated in FIG. 3, the movable range display system 32 includes a system-side communication device 33, an input device 34, a display device 35, and a system control device 36. Note that the system control device 36 functions as a "first acquisition unit", a "second acquisition unit", a "third acquisition unit", a "calculation unit", and a "display unit" of the present invention.

The system-side communication device 33 is a device that transmits and receives information to and from the control device 31 of the crane 1, an external server that is not illustrated, and the like. The system-side communication device 33 is provided in the cabin 17. The system-side communication device 33 is configured to acquire the current position and arrangement direction of the vehicle 2 in the crane 1 and the current operation condition of the crane 1 from the control device 31 of the crane 1. Further, the system-side communication device 33 is configured to acquire three-dimensional information of the work site where the crane 1 is arranged from the external server or the like. The operation condition of the crane 1 is a condition that affects the movable range A of the load W, and refers to the model of the crane 1, the overhanging amount of the outrigger 5, the boom length of the boom 9, the use state of the jib, and the weight of a counterweight in the present embodiment.

The input device 34 is a device to which the operator inputs operating conditions of the crane 1. The input device 34 is provided in the cabin 17. Further, the input device 34 is configured to be displayed on the display device 35 and input from the screen. The input device 34 is configured to input an arbitrary value regarding the weight of the carried load W, the arrangement position and arrangement direction of the vehicle 2 in the crane 1, the operation condition of the crane 1, and the like.

The display device 35 is a device that displays the movable range A of the crane 1 and the input device 34. The display device 35 is arranged inside the cabin 17. The display device 35 includes a touch panel that can be input from a screen. The display device 35 is configured to display a two-dimensional image and a three-dimensional image of the work site, the crane 1, the movable range A of the crane 1, the operation conditions of the crane 1, and the like.

The system control device 36 is a control device that calculates the movable range A of the crane 1 from three-dimensional information of the work site, the weight of the load W, the arrangement position and arrangement direction of the vehicle 2 the crane 1, the operating condition of the crane 1, and the like. The system control device 36 is provided in the cabin 17. The system control device 36 may substantially have a configuration in which a CPU, a ROM, a RAM, an HDD, and the like are connected by a bus, or may have a configuration including a one-chip LSI or the like. The system control device 36 stores various programs and data in order to acquire information from the system-side communication device 33 and the input device 34, calculate the movable range A of the crane 1, and display the movable range A on the display device 35.

The system control device 36 is connected to the system-side communication device 33, and can acquire three-dimensional information of the work site via the system-side communication device 33. Further, the system control device 36 can acquire the current position and arrangement direction of the vehicle 2 the crane 1 via the system-side communication device 33. Further, the system control device 36 can acquire the operation condition of the crane 1 via the system-side communication device 33.

The system control device 36 is connected to the input device 34 and can acquire three-dimensional information of the work site via the input device 34. Further, the system control device 36 can acquire the weight of the load W, the model of the crane 1, the arrangement position and arrangement direction of the vehicle 2 in the crane 1 arbitrarily determined by the operator, and the operating condition of the crane 1 via the input device 34.

The system control device 36 can calculate a difference between the acquired current arrangement position and arrangement direction of the vehicle 2 in the crane 1 and the arrangement position and arrangement direction of the vehicle 2 arbitrarily determined by the operator. That is, the system control device 36 can calculate the moving distance and the moving direction from the current position to the arbitrarily determined arrangement position of the vehicle 2, and the moving angle from the current arrangement direction of the vehicle 2 to the arbitrarily determined arrangement direction.

The system control device 36 is connected to the display device 35, and can cause the display device 35 to display the two-dimensional image or the three-dimensional image of the work site. Further, the system display device 35 can display an image M1 of the crane 1 and the movable range A of the crane 1 on the display device 35. In the present embodiment, it is assumed that a two-dimensional image is displayed on the display device 35.

As illustrated in FIGS. 4A and 4B, the system control device 36 can display an image expressing the boom length, the slewing angle α, and the raising-lowering angle β based on the current operation condition of the crane 1. When displaying the two-dimensional image, the system control device 36 can display by switching between the image M1 of the crane 1 and the movable range A (see the shaded portion in FIG. 4A) in a top view image, which is a display from above the crane 1, and the image M1 of the crane 1 and the movable range A (see the shaded portion in FIG. 4B) in a side view image, which is a cross-sectional view along the boom 9 at the arbitrary slewing angle α.

The system control device 36 can calculate, as the movable range A, a region excluding a range in which the boom 9 is likely to interfere with the feature C or the like on the basis of the three-dimensional information of the work site from the weight of the load W, the model of the crane 1, the operating condition of the crane 1, the three-dimensional information of the work site, and the arrangement position and arrangement direction of the vehicle 2 of the crane 1 at the work site, which are acquired via the system side communication device 33 and the input device 34, and can cause the display device 35 to display the movable range A.

Since the movable range display system 32 configured as described above acquires the three-dimensional information of the work site, a range in which the load W can be conveyed when the crane 1 is arranged in an arbitrary direction at an arbitrary position in the work site is displayed before the crane 1 is actually arranged at the work site. Further, the movable range display system 32 displays an arbitrary arrangement position where the operator displays the movable range A, and a moving amount and a moving direction to an arrangement direction.

Next, control of the movable range display system 32 will be described using FIGS. 5A to 7B. The movable range display system 32 has a check mode for displaying the movable range A of the crane 1 in the current arrangement position and arrangement direction, and a plan mode for displaying the movable range A of the crane 1 in the arbitrary arrangement position and arrangement direction.

The system control device 36 of the movable range display system 32 starts the check mode when the crane 1 is started. The system control device 36 acquires three-dimensional information of the work site and the current arrangement position and arrangement direction of the vehicle 2 in the crane 1 via the system-side communication device 33 at every unit time. Moreover, the system control device 36 acquires the operating condition of the crane 1 via the system-side communication device 33 at every unit time. Further, the system control device 36 acquires the weight of the load W via the system-side communication device 33 at every unit time.

Figure 5A:
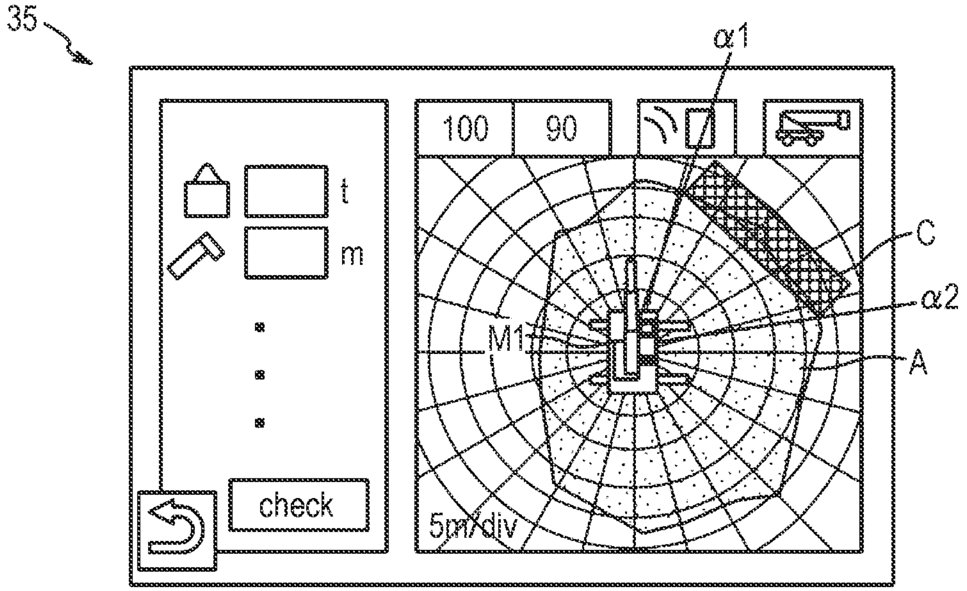
FIGS. 5A and 5B illustrate conditions for calculating the movable range in consideration of a feature.
Figure 5B:
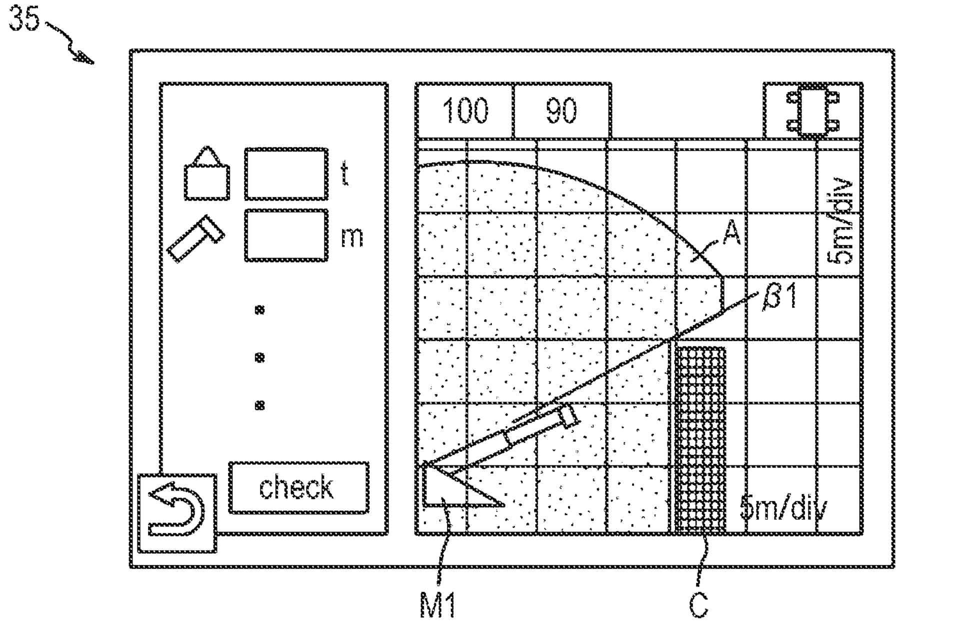

As illustrated in FIGS. 5A and 5B, the system control device 36 calculates the slewing angle α2 from the slewing angle α1 at which the boom 9 interferes with the feature C at the work site on the basis of the three-dimensional information of the work site (see FIG. 5A). Next, the system control device 36 calculates a minimum raising-lowering angle β1 at which the boom 9 interferes with the feature C between the slewing angle α1 and the slewing angle α2 for each unit slewing angle. Moreover, the system control device 36 calculates, for each unit raising-lowering angle, a range that the tip of the boom 9 can reach between the slewing angle α1 and the slewing angle α2 at the raising-lowering angle β1 or more (see FIG. 5B). The system control device 36 displays, on the display device 35, the movable range A (see the shaded portion) in consideration of the range that the tip of the boom 9 can reach between the slewing angle α1 at which the boom 9 interferes with the feature C and the slewing angle α2.

The system control device 36 displays the movable range A in the current position of the vehicle 2, which is calculated on the basis of the acquired information, and the arrangement direction on the display device 35 at every unit time. When the crane 1 moves, the system control device 36 displays the movable range A in the new arrangement position and arrangement direction of the vehicle 2. That is, in the check mode, the movable range display system 32 calculates the movable range A in the current arrangement position and arrangement direction under the current operating condition along with the movement of the crane 1, and sequentially displays the movable range A.

Figure 6A:
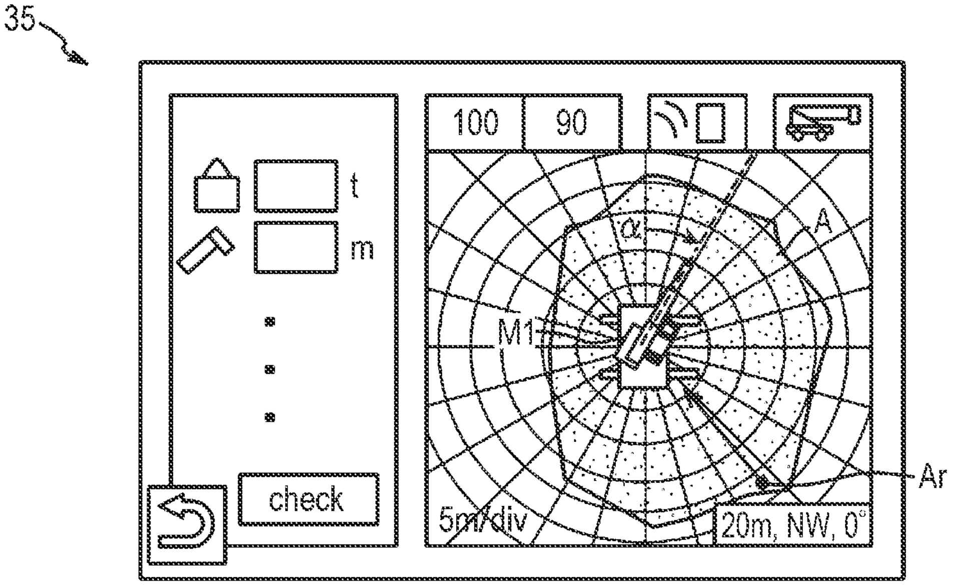
FIGS. 6A and 6B illustrate a display mode in a case where the movable range is rotated.
Figure 6B:
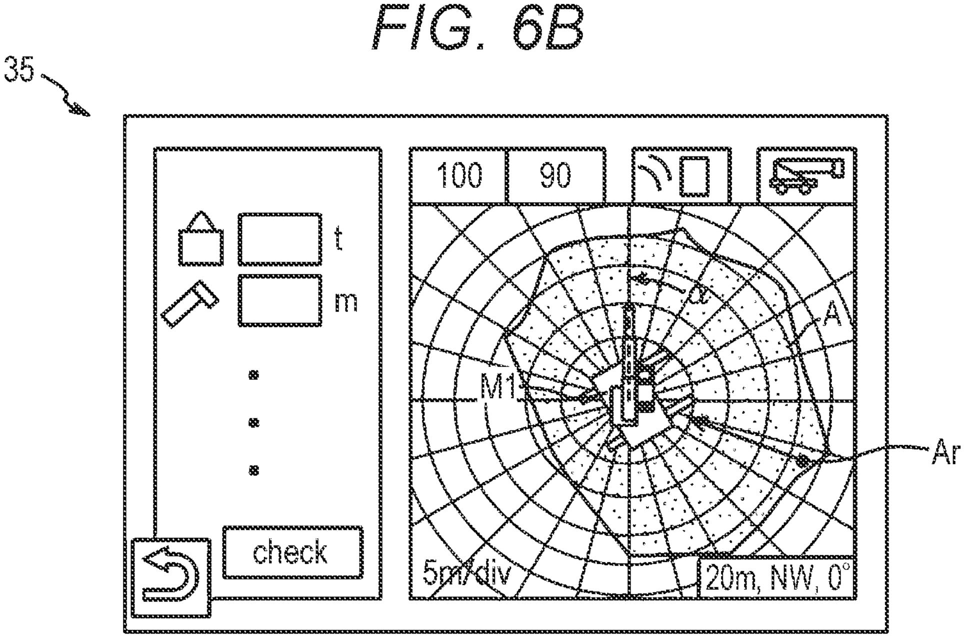

As illustrated in FIGS. 6A and 6B, when the plan mode is selected, the system control device 36 calculates the movable range A under an arbitrary operating condition in an arbitrary arrangement position and arrangement direction. The system control device 36 causes the display device 35 to display an input screen constituting the input device 34. The system control device 36 acquires an arbitrary operating condition of the crane 1 and an arbitrary arrangement position and arrangement direction of the vehicle 2 from the input device 34, and calculates the movable range A in the arbitrary arrangement position and arrangement direction under an arbitrary operating condition. Moreover, the system control device 36 calculates a moving distance and a moving direction from the current position to an arbitrary arrangement position of the vehicle 2, and a moving angle from the current arrangement direction to an arbitrary arrangement direction of the vehicle 2 by an arrow Ar and character information, and causes the display device 35 to display the moving distance, the moving direction, and the moving angle.

In the check mode and the plan mode, when the slewing table 7 of the crane 1 slews in one direction from the reference position by the slewing angle α (see FIG. 6A), the system control device 36 can display the top view of the two-dimensional image or the three-dimensional image of the work site displayed on the display device 35 and the movable range A by rotating in another direction by the slewing angle α (see FIG. 6B). With this configuration, the work site and the movable range A (see the shaded portion) are displayed with reference to the cabin 17 that slews together with the sieving table 7, so that the operator can easily grasp the positional relationship at the work site.

Figure 7A:
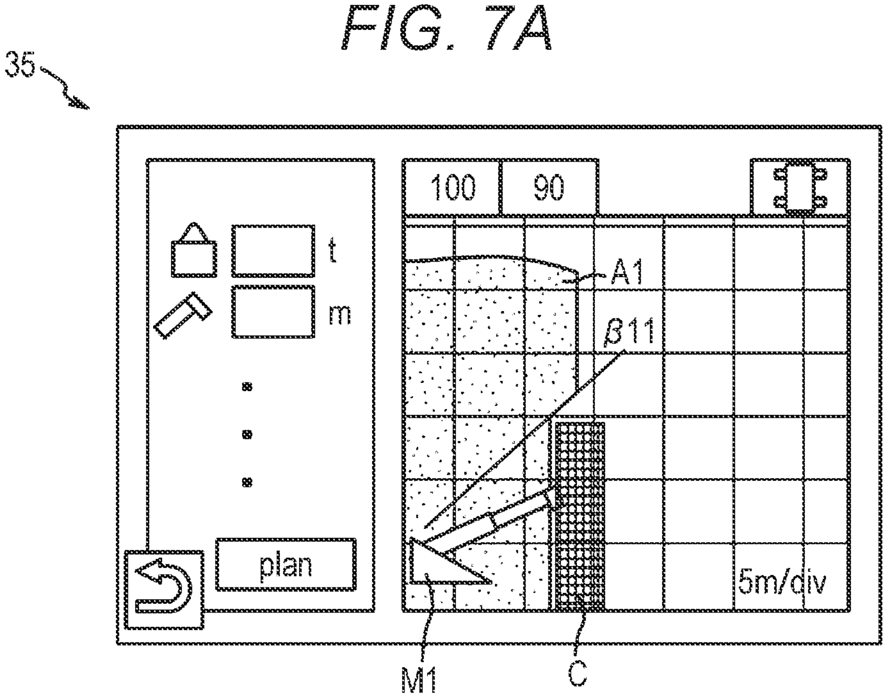
FIGS. 7A and 7B illustrate a difference in the movable range depending on a position of the crane with respect to the feature.
Figure 7B:
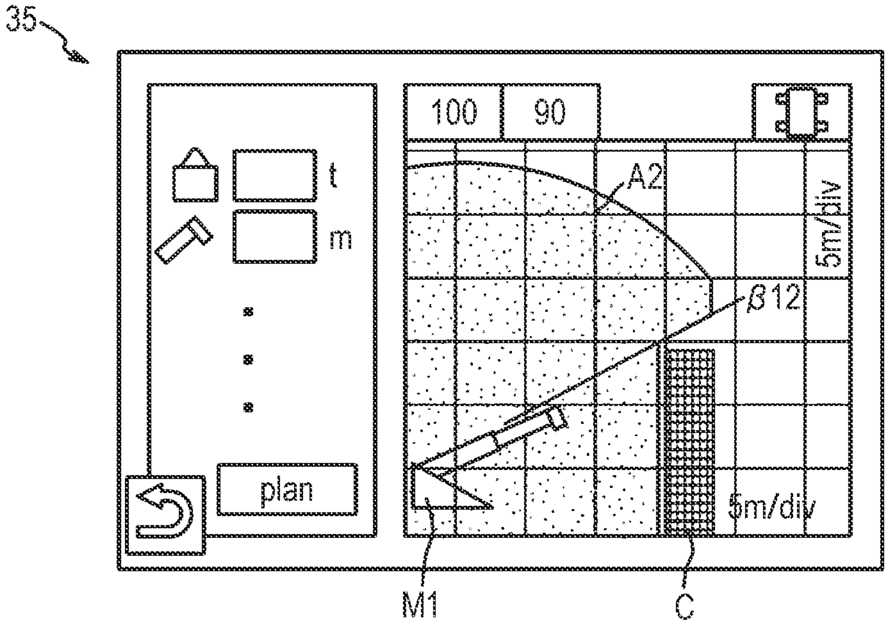

As illustrated in FIGS. 7A and 7B, the movable range A (see the shaded portion) of the crane 1 varies depending on the positional relationship with the feature C. For example, the minimum raising-lowering angle β11 (see FIG. 7A) at which the boom 9 in the crane 1 arranged close to the feature C interferes with the feature C is larger than the minimum raising-lowering angle β12 (see FIG. 7B) at which the boom 9 in the crane 1 arranged apart from the feature C interferes with the feature C. Therefore, a movable range A1 of the crane 1 arranged close to the feature C illustrated in FIG. 7A is smaller than a movable range A2 of the crane 1 arranged apart from the feature C illustrated in FIG. 7B.

Hereinafter, movable range display control by the movable range display system 32 will be specifically described using FIG. 8. Note that in the present embodiment, it is assumed that the three-dimensional information of the work site has already been acquired.

Figure 8:
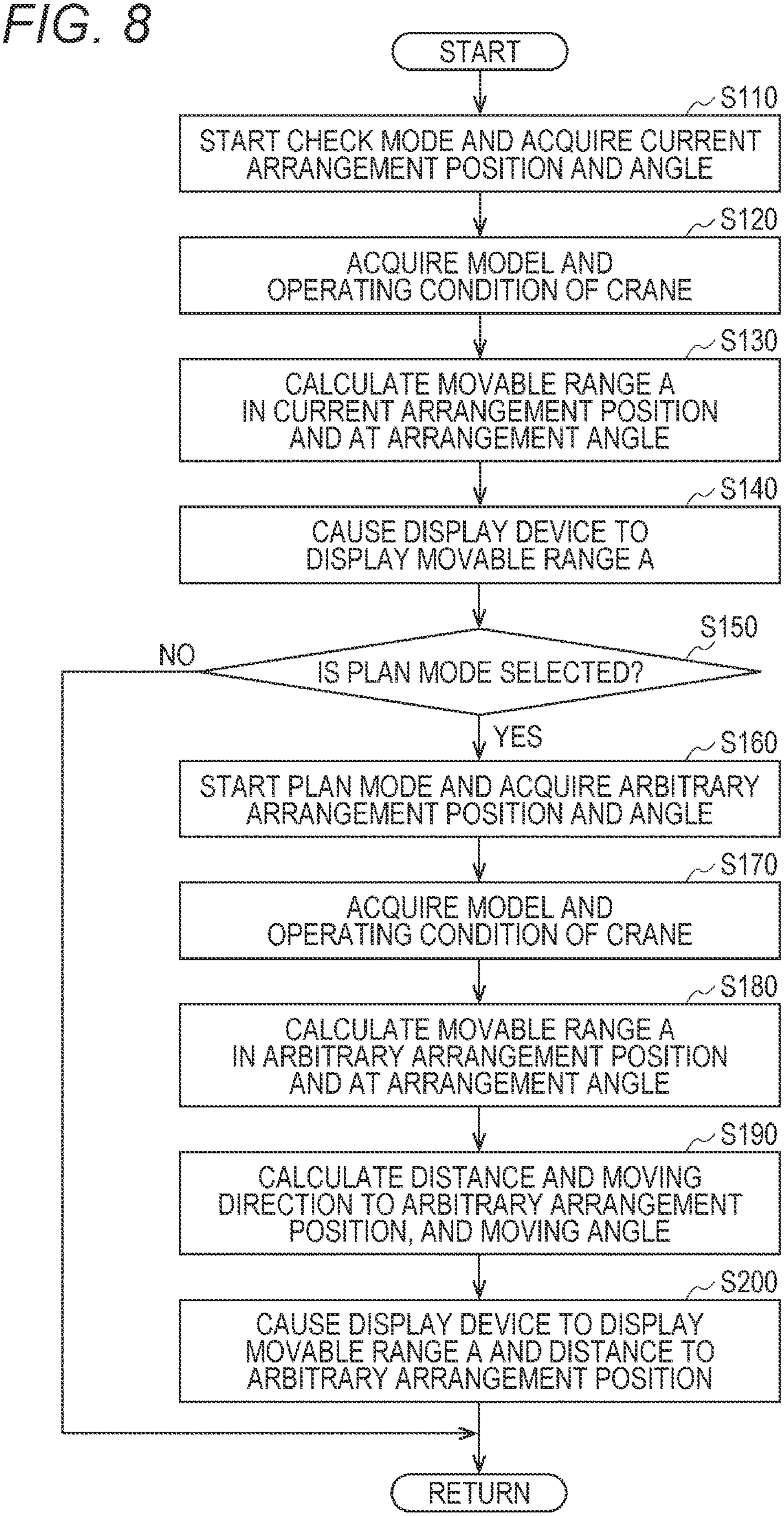
FIG. 8 is a flowchart illustrating a mode of movable range display control in the movable range display system.

As illustrated in FIG. 8, in step S110 of the movable range display control, the system control device 36 starts the check mode when the crane 1 is started, acquires the current arrangement position and arrangement direction of the vehicle 2 in the crane 1, and advances the step to step S120.

In step S120, the system control device 36 acquires the model of the crane 1 and the operating condition of the crane 1 via the system-side communication device 33 or the input device 34, and advances the step to step S130.

In step S130, the system control device 36 calculates the movable range A in the current arrangement position and arrangement direction from the acquired information, and advances the step to step S140.

In step S140, the system control device 36 causes the display device 35 to display the calculated movable range A, and advances the step to step S150.

In step S150, the system control device 36 determines whether or not the plan mode is selected. Consequently, when the plan mode is selected, the system control device 36 advances the step to step S160. On the other hand, when the plan mode is not selected, that is, when the check mode is maintained, the system control device 36 advances the step to step S110.

In step S160, the system control device 36 starts the plan mode, acquires an arbitrary arrangement position and arrangement direction of the vehicle 2 in the crane 1, and advances the step to step S170.

In step S170, the system control device 36 acquires the model of the crane 1 and the operating condition of the crane 1 arbitrarily selected via the input device 34, and advances the step to step S180.

In step S180, the system control device 36 calculates the movable range A in the arbitrary arrangement position and arrangement direction from the acquired information, and advances the step to step S190.

In step S190, the system control device 36 calculates a moving distance and a moving direction from the current arrangement position to the arbitrary arrangement position, and a moving angle from the current arrangement direction to the arbitrary arrangement direction, and advances the step to step S200.

In step S200, the system control device 36 causes the display device 35 to display the calculated movable range A, the moving distance and the moving direction to the arbitrary arrangement position, and the like, and advances the step to step S110.

In a case of the check mode, the movable range display system 32 configured as described above sequentially displays the movable range A on the basis of the current arrangement position and arrangement direction of the vehicle 2 in the crane 1 at every unit time. In the movable range display system 32, since the position and the shape of the feature C with reference to the accurate position of the mobile crane 1 at the work site are specified, the movable range A considering the position and the shape of the feature C is calculated with high accuracy.

Further, in a case of the plan mode, the movable range display system 32 displays the movable range A based on the arbitrary arrangement position and arrangement direction of the vehicle 2 in the crane 1. Moreover, the movable range display system 32 displays the moving distance, the moving direction, and the moving angle of the vehicle 2 to the arbitrary arrangement position and arrangement direction. The movable range display system 32 enables to easily check whether the mobile crane 1 as arranged in the arrangement position and arrangement direction of the mobile crane 1 specified for carrying the load W at the work site. Thus, the user who uses the movable range display system 32 can consider the arrangement position and arrangement direction of the mobile crane 1 capable of conveying the load W to the destination without interfering with the feature C or the like in the work site.

Note that in the present embodiment, the movable range display system 32 is provided inside the cabin 17 of the crane 1, but may be provided in a mobile terminal that can be carried outside the cabin 17. For example, the remote operation terminal 37 that is a mobile terminal is provided with the system-side communication device 33, the input device 34, the display device 35, and the system control device 36 in addition to various operation parts for operating the crane 1 (see FIG. 3). Further, the remote operation terminal 37 includes a terminal-side GNSS receiver 38. The system control device 36 can acquire the current position of the remote operation terminal 37 from the terminal-side GNSS receiver 38 via the system-side communication device 33. Note that in the present embodiment, the remote operation terminal 37 may be provided with a short-range wireless communication device capable of detecting a position instead of the terminal-side GNSS receiver 38.

Figure 9:
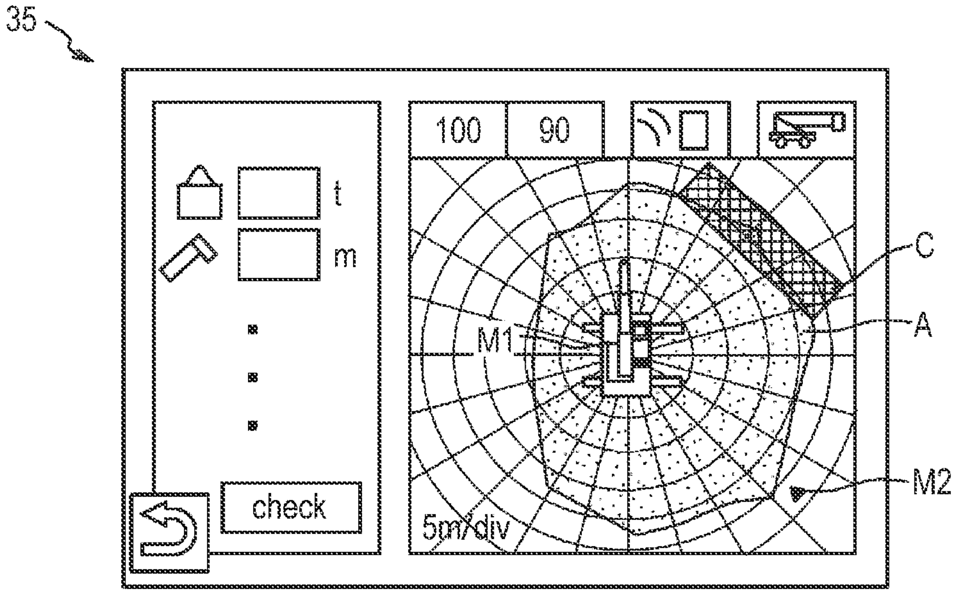
FIG. 9 illustrates a display mode including the movable range and a position of a remote operation terminal.

As illustrated in FIG. 9, upon acquiring the current position of the remote operation terminal 37 in the check mode and the plan mode, the system control device 36 displays an image M2 indicating the remote operation terminal 37 in the three-dimensional image or the two-dimensional image of the work site displayed on the display device 35. With this configuration, in the movable range display system 32, the positional relationship among the crane 1, the feature C, and the operator at the work site becomes clear. Thus, the user who uses the movable range display system 32 can consider the arrangement position and arrangement direction of the mobile crane 1 capable of conveying the load W to the destination without interfering with the feature C or the like in the work site.

Figure 10A:
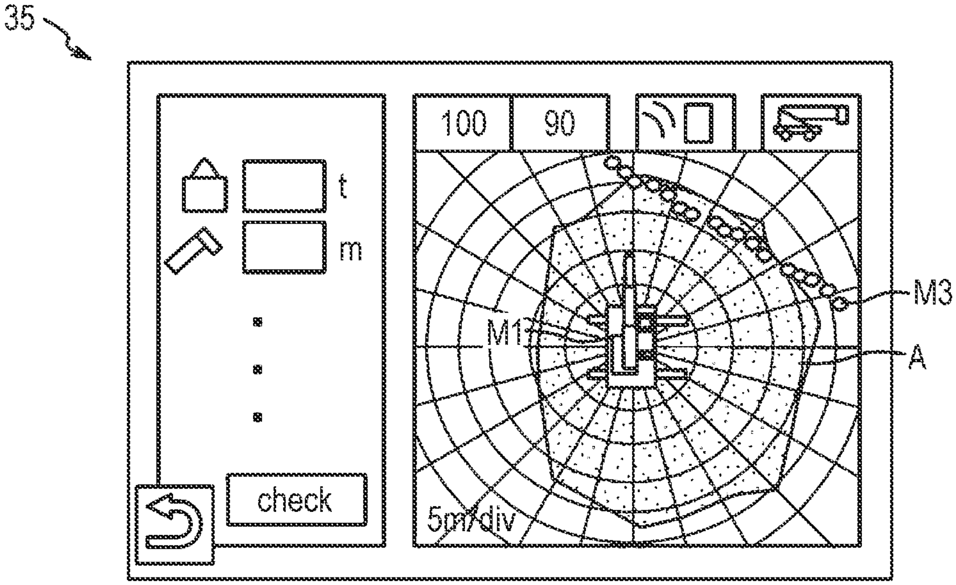
FIGS. 10A and 10B illustrate a display mode of the movable range based on data of a distance sensor of a boom tip.
Figure 10B:
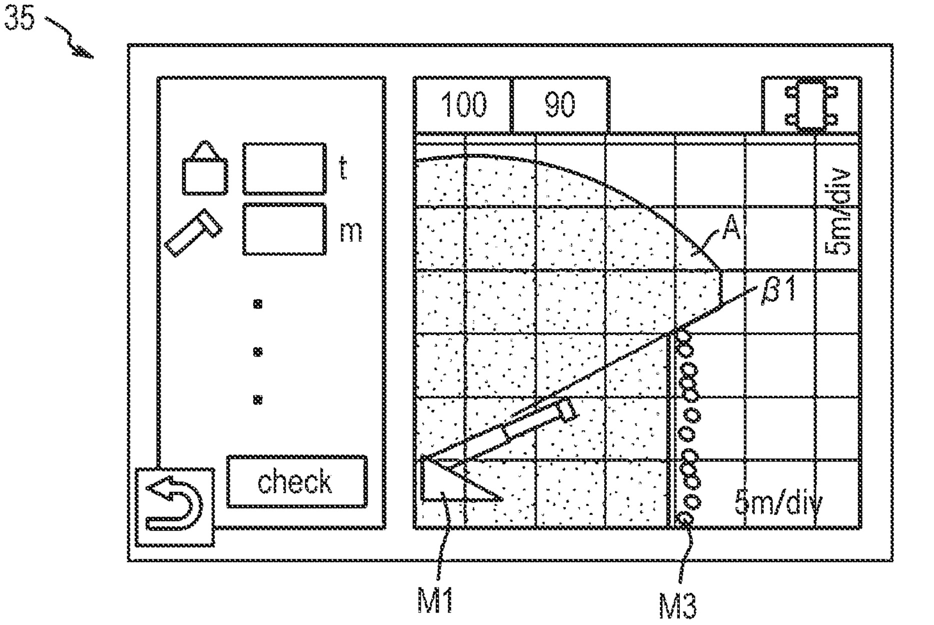

Note that in the present embodiment, although the system control device 36 of the movable range display system 32 acquires the three-dimensional information of the work site from the external server or the like, as illustrated in FIGS. 10A and 10B, a configuration may be employed in which a distance sensor, a laser scanner, or the like that detects the distance to the object is provided at the tip of the boom 9 to collect the three-dimensional information of the work site. The system control device 36 calculates the movable range A (see the shaded portion) on the basis of a measurement value of the distance sensor, causes the display device 35 to display the movable range A, and displays the measurement result on the movable range A as an image M3 in an overlaid manner.

The above-described embodiments are merely representative forms, and various modifications can be made without departing from the gist of one embodiment. It is a matter of course that the present invention can be implemented in various forms, and the scope of the present invention is indicated by the description of the claims, and further includes equivalent meanings described in the claims and all modifications within the scope.

REFERENCE SIGNS LIST

1 crane
6 crane apparatus
9 boom
30 GNSS receiver
31 control device
32 movable range display system
33 system-side communication device
34 input device
35 display device
36 system control device
A movable range

The invention claimed is:

1. A movable range display system comprising:

a first acquisition unit configured to acquire three-dimensional information of a work site;

a second acquisition unit configured to acquire an operating condition of a crane in which a boom is provided in a travelling body and a weight of a load carried by the crane;

a third acquisition unit configured to acquire an arrangement position and an arrangement direction of the travelling body at the work site;

a calculation unit configured to calculate a movable range of the crane in the arrangement position and the arrangement direction of the travelling body on a basis of the three-dimensional information of the work site, the operating condition, and the weight of the load;

a display unit configured to display an image indicating the work site, an image indicating the crane, and the movable range in an overlaid manner; and an input unit configured to receive, by an operator, an input of an arbitrary value regarding the operating condition of the crane and the arrangement position and arrangement direction of the travelling body of the crane, wherein the movable range of the crane is calculated by excluding, from a first range in which a tip of the boom can reach in the work site in a state where the load is suspended on the boom, a second range in which the boom has a possibility to interfere with a feature in the work site, wherein the movable range display system is configured to execute a first mode for displaying the movable range of the crane when the travelling body is at a current arrangement position and arrangement direction, and a second mode for displaying the movable range of the crane when the travelling body is at an arrangement position and arrangement direction input to the input unit, wherein the second acquisition unit is further configured to acquire a current state of the crane as the operating condition in the first mode, and acquire the operating condition input to the input unit in the second mode, wherein the third acquisition unit is further configured to acquire the current arrangement position and arrangement direction of the travelling body based on a signal of a Global Navigation Satellite System (GNSS) receiver of the crane in the first mode, and acquire the operating condition input to the input unit in the second mode, wherein the calculation unit is further configured to calculate the movable range in the current arrangement position and arrangement direction of the travelling body based on current operating conditions of the crane in the first mode, and calculate the movable range in the arrangement position and arrangement direction of the travelling body input to the input unit in the second mode, and wherein the first acquisition unit, the second acquisition unit, the third acquisition unit, the calculation unit, the display unit, and the input unit are each implemented via at least one processor.

2. The movable range display system according to claim 1, wherein the calculation unit is further configured to calculate a moving direction and a moving distance from a current arrangement position of the travelling body based on a signal of the GNSS receiver of the crane to the arbitrary arrangement position, and a moving angle from a current arrangement direction of the travelling body based on the signal to the arbitrary arrangement direction.

3. The movable range display system according to claim 1, wherein the movable range display system is incorporated in a mobile terminal, and the display unit is further configured to display a position of the mobile terminal in an image indicating the work site.

* * * * *